United States Patent
Ide et al.

(10) Patent No.: US 9,083,467 B2
(45) Date of Patent: Jul. 14, 2015

(54) OPTICAL TRANSMISSION APPARATUS AND OPTICAL TRANSMISSION METHOD

(71) Applicant: FUJITSU LIMITED, Kawasaki (JP)

(72) Inventors: Satoshi Ide, Yokohama (JP); Tadashi Ikeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 13/669,957

(22) Filed: Nov. 6, 2012

(65) Prior Publication Data

US 2013/0183032 A1 Jul. 18, 2013

(51) Int. Cl.
*H04B 10/08* (2006.01)
*H04B 17/00* (2006.01)
*H04B 10/00* (2013.01)
*H04B 10/04* (2006.01)
*H04B 10/12* (2006.01)
*H04B 10/40* (2013.01)

(52) U.S. Cl.
CPC ..................................... *H04B 10/40* (2013.01)

(58) Field of Classification Search
None
See application file for complete search history.

(56) References Cited

U.S. PATENT DOCUMENTS

| | | | | |
|---|---|---|---|---|
| 5,696,859 A | * | 12/1997 | Onaka et al. | 385/24 |
| 2005/0018732 A1 | * | 1/2005 | Bond et al. | 372/50 |
| 2005/0129350 A1 | * | 6/2005 | Welch et al. | 385/14 |
| 2009/0196602 A1 | * | 8/2009 | Saunders et al. | 398/26 |
| 2010/0166424 A1 | * | 7/2010 | Nagarajan et al. | 398/79 |
| 2012/0087660 A1 | * | 4/2012 | Treyer et al. | 398/58 |

FOREIGN PATENT DOCUMENTS

| | | |
|---|---|---|
| JP | 3544932 | 4/2004 |
| JP | 2007-13504 | 1/2007 |
| JP | 2011-44827 | 3/2011 |
| WO | WO 2010/121658 A1 * | 10/2010 |

* cited by examiner

*Primary Examiner* — Shi K Li
*Assistant Examiner* — Mina Shalaby
(74) *Attorney, Agent, or Firm* — Staas & Halsey LLP

(57) ABSTRACT

An optical transmission apparatus includes an optical transmitter that includes a light emitting element and a driver circuit for the light emitting element, a temperature sensor that detects a temperature of the optical transmitter, and a controller that switches an operation mode of the optical transmitter from a normal mode to a low-power mode so as to reduce a heating effect to the light emitting element and allow an operation of the light emitting element to continue when the temperature detected by the temperature sensor is equal to or higher than a given temperature.

19 Claims, 13 Drawing Sheets

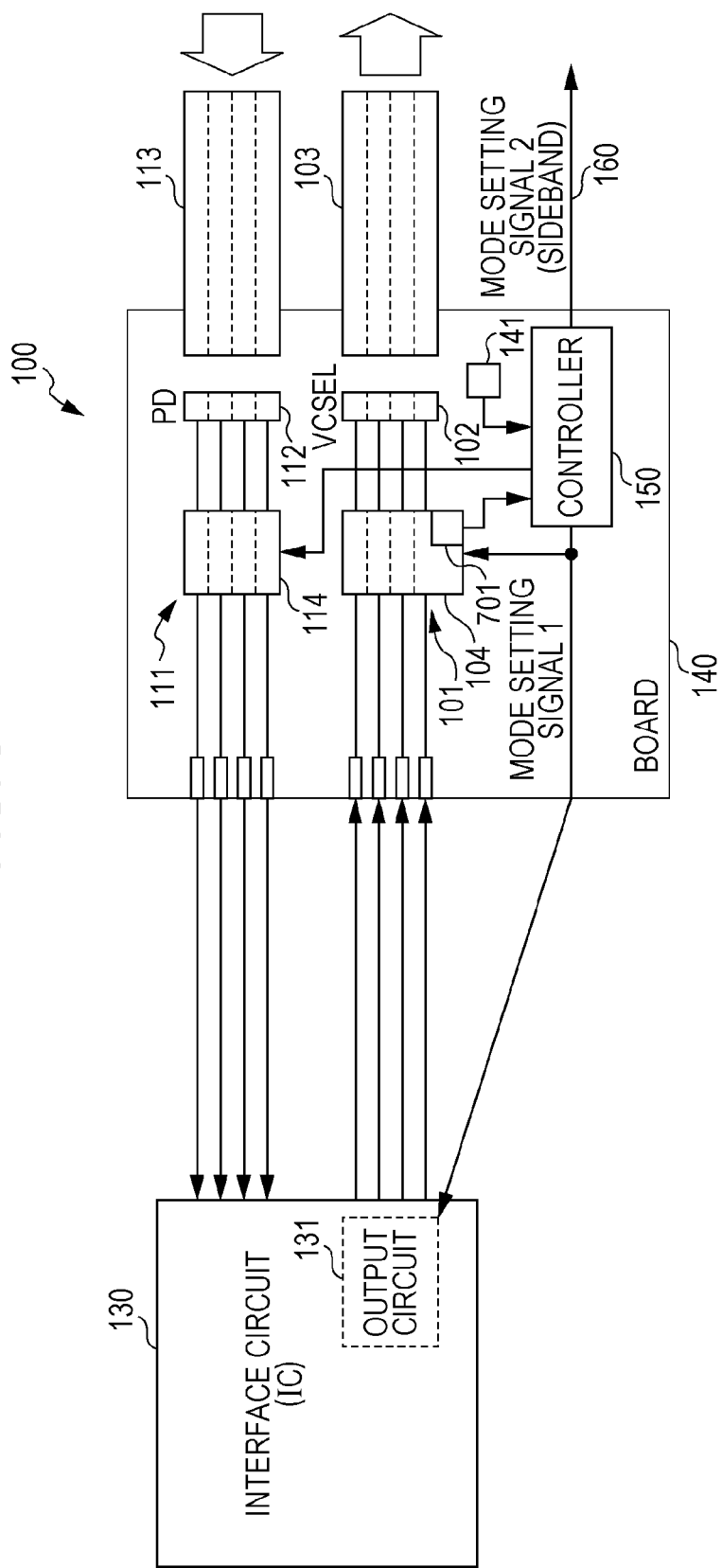

OPTICAL TRANSMISSION APPARATUS AND OPTICAL TRANSMISSION METHOD

CROSS-REFERENCE TO RELATED APPLICATION

This application is based upon and claims the benefit of priority of the prior Japanese Patent Application No. 2012-004502, filed on Jan. 12, 2012, the entire contents of which are incorporated herein by reference.

FIELD

The embodiments discussed herein are related to optical transmission apparatuses that transmit light signals and optical transmission methods.

BACKGROUND

In recent years, as speeds and volumes of signal transmissions among CPUs in high-end servers, super computers, and the like increase, an optical interconnect technology, which uses lights for close and medium range signal transmissions, is being studied in an attempt to break through limitations of electric signal transmissions. In the optical interconnect, optical transceivers or the like that convert electrical signals to optical signals are provided to perform data transmissions using light signals between optical transmission apparatuses on a transmitting side and a receiving side through transmission channels such as, for example, array optical fibers or the like. For example, a vertical cavity surface emitting laser (VCSEL), which is a small and low power consumption laser device and operable by direct current modulation, can be used as a light signal source for the optical transmission. As an optical receiver, a photodiode (PD) that receives light signals and convert to electrical signals can be used, for example. For example, of the optical transceiver technologies, the following patent documents disclose technologies that control a power consumption based on status of optical transmission apparatus.

Japanese Laid-open Patent Publication No. 2011-044827 discloses a technology for reducing the power consumption of a light emitting element by limiting or stopping a drive current of the light emitting element in response to priority of data to be transmitted when a temperature of an optical transmission apparatus becomes high. Japanese Patent No. 3544932 discloses a technology that reduces the power consumption by reducing a frequency of a tone signal to be transmitted for connection monitoring during a low power consumption mode. Japanese Laid-open Patent Publication No. 2007-013504 discloses a technology for lowering the power consumption by switching to a low speed transmitter circuit and a low speed receiver circuit during a standby mode.

Characteristics of optical elements are known to deteriorate with a temperature increase. More specifically, the characteristics of VCSEL that is a light emitting element of an optical transmission apparatus rapidly deteriorate as the temperature increases, and an operation thereof may stop. In the optical interconnect, it is desirable not to stop a system operation so as not to disconnect the signal transmission even in a range exceeding a given specification temperature (for example, 70-80° C.). To expand an operable temperature range and enable a high-temperature operation at a temperature equal to or higher than the specification temperature, it is effective to suppress the temperature increase by reducing power consumption and reduce a heating effect to the light emitting element. However, when the temperature exceeds the specification temperature (for example, 70-80° C.) that defines stable operations of the light emitting elements, the technologies disclosed by the above three patent documents are unable to continue the stable operation nor expand the operable temperature range of the optical transmission apparatus, and their optical transmission operations become to stop.

A control for reducing the heating effect to the light emitting element is desirable to expand the operable temperature range of the optical transmission apparatus and more specifically to continue the operation at a high temperature exceeding the specification temperature, and implementation thereof is awaited.

SUMMARY

According to an aspect of the invention, an optical transmission apparatus includes an optical transmitter that includes a light emitting element and a driver circuit for the light emitting element, a temperature sensor that detects a temperature of the optical transmitter, and a controller that switches an operation mode of the optical transmitter from a normal mode to a low-power mode so as to reduce a heating effect to the light emitting element and allow an operation of the light emitting element to continue when the temperature detected by the temperature sensor is equal to or higher than a given specification temperature.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a structure of an optical transmission apparatus according to an embodiment 2.

DESCRIPTION OF EMBODIMENTS

Structure of Optical Transmission Apparatus

Figure 1:
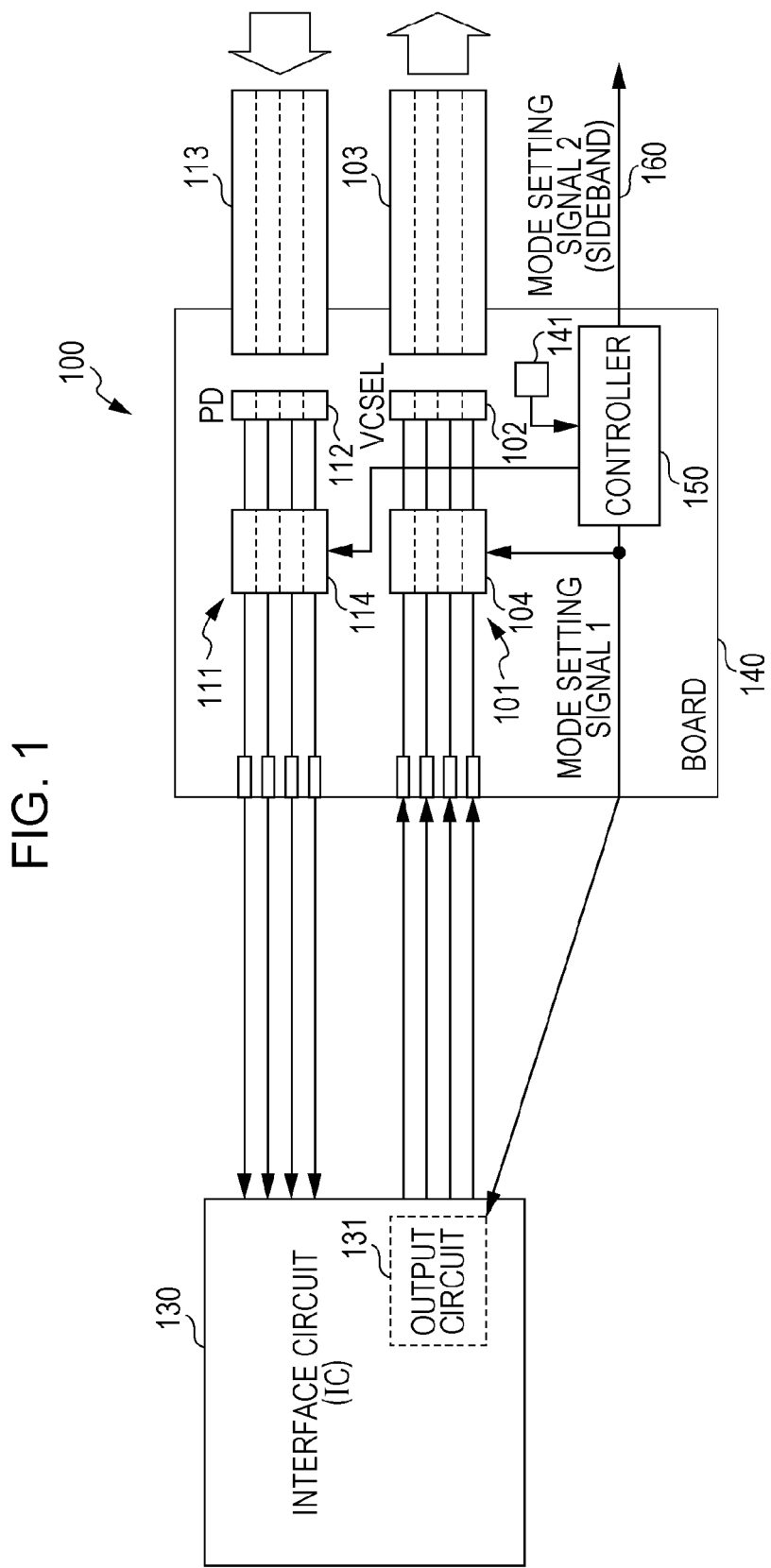
FIG. 1 illustrates a structure of an optical transmission apparatus according to an embodiment 1.

Hereinafter, preferred embodiments of a disclosed technology are described in detail with reference to the attached drawings. FIG. 1 is a diagram illustrating a structure of an optical transmission apparatus according to an embodiment 1. A disclosed optical transmission apparatus 100 is a multiple channel (four channels in an illustrated example) optical transceiver in which an optical transmitter 101 and an optical receiver 111 are integrated into a single unit.

The optical transmitter 101 includes a light emitting element 102 that generates (optical-to-electrical conversion) multiple channel (four channels in the illustrated example) light signals, an array fiber 103 that has multiple channels for transmitting light signals corresponding to the number of channels of the light emitting element 102, and a light emitting element driver circuit 104 that drives the light emitting element 102. The light emitting element 102 may include at least one of a vertical cavity surface emitting laser (VCSEL), a laser diode (LD) and a light-emitting diode (LED), for example. The optical receiver 111 includes a light detecting element 112 that receives (electrical-to-optical conversion) multiple channel (four channels in the illustrated example) light signals, an array fiber 113 that transmits light signals corresponding to the number of channels to receive, and a receiver circuit 114. The light detecting element may include a photodiode (PD), for example.

The light emitting element driver circuit 104 includes a bandwidth expander circuit for performing a bandwidth expansion (pre-emphasis) of signals to be transmitted to the light emitting element 102. An operation of the bandwidth expander (pre-emphasis) circuit can be switched by turning ON/OFF at a time of mode switching, which will be described below. Furthermore, the light emitting element driver circuit 104 is capable to change an optical power of the light emitting element 102 by controlling a drive current to be supplied to the light emitting element 102. The light emitting element driver circuit 104 is arranged near the light emitting element 102, and in a state where heat generated therein may be easily conducted to the light emitting element 102.

The optical transmission apparatus 100 is connected to an interface circuit 130 that is configured by an integrated circuit (IC), etc. The interface circuit 130 includes an output circuit 131 that transmits signals for transmission to the light emitting element driver circuit 104 of the optical transmitter 101. Furthermore, the interface circuit 130 includes an input circuit that receives signals from the receiver circuit 114 of the optical receiver 111.

The optical transmitter 101 and the optical receiver 111 are mounted on a board 140. Furthermore, a temperature sensor 141 and a controller 150 are mounted on the board 140. The temperature sensor 141 on the board 140 measures a temperature of the board 140, namely, a module temperature outside the light emitting element 102 and the light emitting element driver circuit 104, and outputs to the controller 150. In the example illustrated in the drawing, the temperature sensor 141 is arranged near the light emitting element 102. Note that the embodiment is not limited to this example. The temperature sensor 141 may also be provided inside the light emitting element driver circuit 104 to measure an internal temperature of the light emitting element driver circuit 104. The controller 150 has a mode switching function for switching an operation mode of the optical transmitter 101 in response to the temperature measured.

The controller 150 measures the temperature of a module, on which the light emitting element 102 is mounted, by use of the temperature sensor 141, and performs the mode switching when the temperature becomes equal to or higher than a given specification temperature, thereby making it possible to continue an optical transmission operation even at a high temperature that exceeds the specification temperature of the light emitting element 102. Furthermore, the controller 150 sends mode setting signals to individual sections relating to signal transmitting of the optical transmitter 101 at the time of mode switching. Those sections are the light emitting element driver circuit 104, the output circuit 131 of the interface circuit 130, and a receiver of a counterpart optical transmission apparatus (a receiver that is a data transmission destination of the optical transmitter 101). Note that, in the embodiment 1, the mode setting signal for the receiver of a counterpart optical transmission apparatus may be sent by using a side-band transmission system 160 that is different from the array fiber 103 for signal transmission.

With Regard to Controller Mode Switching

An overview of the mode switching by the controller 150 is described. When the temperature sensor 141 measures the temperature equal to or higher than the given specification temperature, the controller 150 performs one of the following controls (1)-(3) or a combination thereof:

(1) Change a transmitting data speed to a low speed. Furthermore, an operation of pre-emphasis performed on data to be transmitted is switched from ON to OFF so as to reduce current consumption.

(2) Change the transmitting data speed to a low speed. Furthermore, an optical power (drive current) of the light emitting element 102 is lowered. At that time, a notification is made to improve sensitivity of the receiver of a counterpart optical transmission apparatus.

(3) Perform a reducing operation to reduce the number of the multiple transmission channels (the number of lanes).

More specifically, the controller 150 outputs mode setting signals 1 and 2. In the case of (1), the mode setting signal 1 is output to the interface circuit 130 to change the transmitting data speed to a low speed. Furthermore, the mode setting signal 1 is output to the light emitting element driver circuit 104 to switch the operation of pre-emphasis from ON to OFF.

In the case of (2), the mode setting signal 1 is output to the interface circuit 130 to change the transmitting data speed to a low speed. Furthermore, the mode setting signal 1 is output to the light emitting element driver circuit 104 to lower the optical power (drive current) of the light emitting element 102. Furthermore, the mode setting signal 2 is output for a receiver circuit 111 of a counterpart optical transmission apparatus.

A controller 150 that received the mode setting signal 2 may output a control signal to the receiver circuit 111, and the control signal enables the receiver circuit 111 to limit a bandwidth thereof to improve its sensitivity. The receiver circuit 111 may be operated with a low pass filter (LPF) for limiting the bandwidth, which allows low speed data to pass while blocking a high frequency component including high speed data. Alternatively, the bandwidth of the receiver circuit 111 may be limited by changing parameters of a feedback circuit, time constants, etc., which determine the bandwidth of the receiver circuit 111. The above bandwidth limiting improves a receiver characteristic of low speed data.

In the case of (3), the mode setting signal 1 is output to the light emitting element driver circuit 104 and the output circuit 131 of the interface circuit 130 to reduce the number of channels for transmitting data.

In the above, the mode setting signals 1 and 2 are assumed to be different signals. Alternatively, these signals may be formed as a single signal, and desired information may be extracted at receiver sides. The mode setting signals 1 and 2 have different destinations. Thus, in the following description, the signals are designated with numerals 1 and 2 for the sake of convenience.

Figure 2:
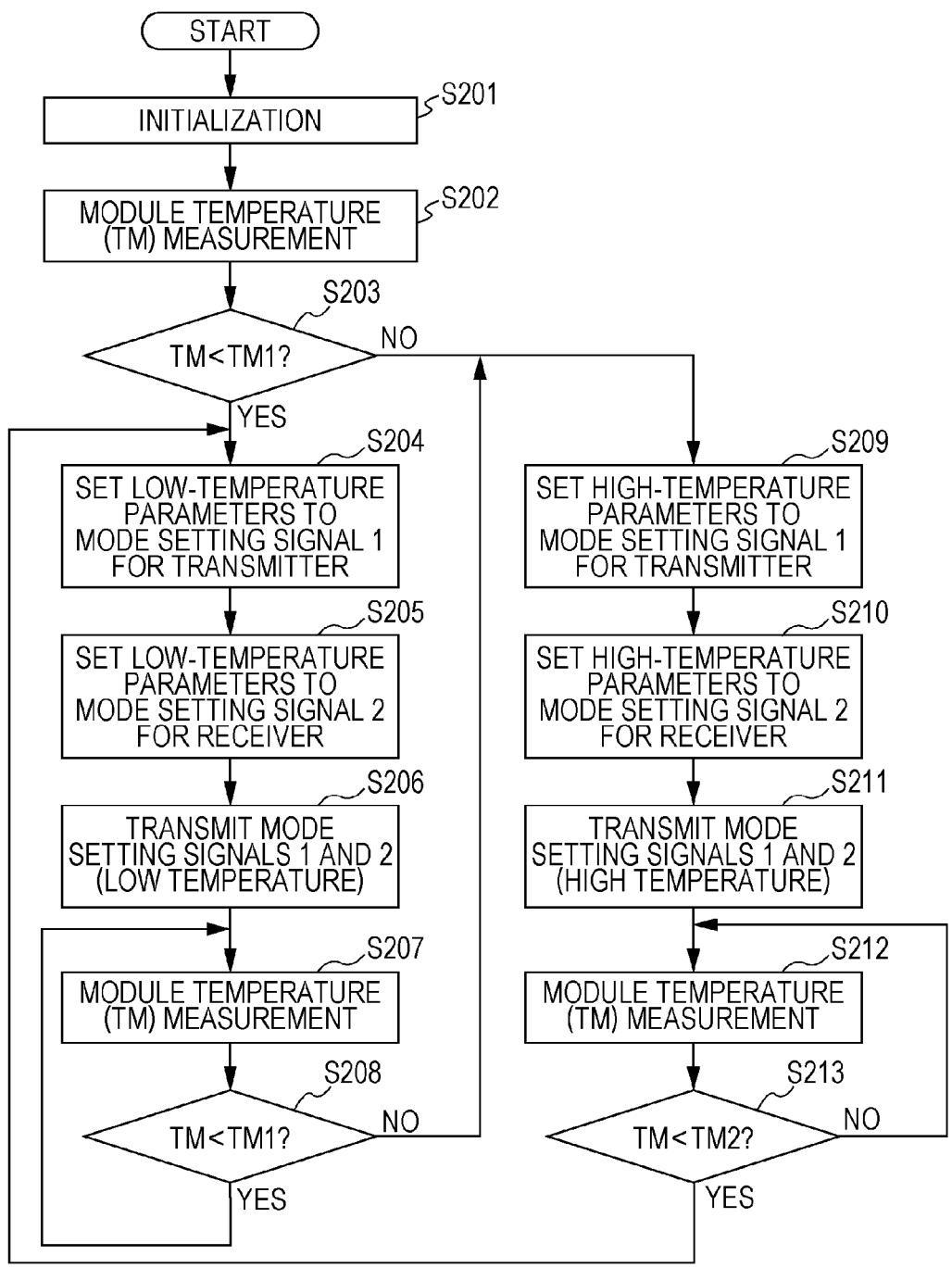
FIG. 2 is a method illustrating control details at a time of mode switching according to the embodiment 1.

In the embodiment 1, a control example of the above (1) performed by the controller 150 at the time of mode switching is described. FIG. 2 is a method illustrating control details at the time of mode switching according to the embodiment 1, and illustrates the details of control to be performed by the controller 150. In the control example of the above (1), a transmitting data speed is changed to a low speed in a low-power mode. Furthermore, the operation of pre-emphasis performed on data to be transmitted is switched from ON to OFF so as to reduce current consumption.

After an initialization (operation S201), the controller 150 measures a module temperature TM of the board 140 by use of the temperature sensor 141 (operation S202). Subsequently, the controller 150 compares the module temperature TM thus measured with a preset module upper limit temperature TM1 (operation S203).

When a comparison result of the operation S203 indicates that the module temperature TM measured is less than the preset module upper limit temperature TM1 (YES in the operation S203), the controller 150 sets low-temperature parameters to the mode setting signal 1 for the optical transmitter 101 (and the interface circuit 130) (operation S204). The low-temperature parameters to be set in the mode setting signal 1 include a transmission speed (lane speed) that is a high speed value (for example, 25 Gbps) used in a normal mode and a value for setting the pre-emphasis ON.

Furthermore, the controller 150 sets low-temperature parameters to the mode setting signal 2 for a receiver that is a data transmission destination of the optical transmitter 101 (a receiver of a counterpart optical transmission apparatus) (operation S205). The low-temperature parameters to be set in the mode setting signal 2 include a transmission speed (lane speed) that is a high speed value (for example, 25 Gbps) used in the normal mode.

Subsequently, the controller 150 transmits the mode setting signal 1 to the optical transmitter 101 (and the interface circuit 130) and the mode setting signal 2 to the receiver of a counterpart optical transmission apparatus (operation S206). The optical transmission apparatus 100 enters into the normal mode by this low-temperature parameter setting. Subsequently, the module temperature TM is measured (operation S207), and the module temperature TM thus measured is again compared with the module upper limit temperature TM1 (operation S208). When the module temperature TM measured is less than the preset module upper limit temperature TM1 (YES in the operation S208), the process returns to the operation S207. When the module temperature TM measured exceeds the preset module upper limit temperature TM1 (NO in the operation S208), the process proceeds to an operation S209.

When the comparison result in the operation S203 or the operation S208 indicates that the module temperature TM measured exceeds the preset module upper limit temperature TM1 (NO in the operation S203 and NO in the operation S208), a high-temperature parameter setting is performed by the operation S209 and beyond.

First, the controller 150 sets high-temperature parameters to the mode setting signal 1 for the optical transmitter 101 (and the interface circuit 130) (operation S209). The high-temperature parameters to be set in the mode setting signal 1 include a transmission speed (lane speed) that is a low speed value (for example, 14 Gbps) used at a time of high temperature (in the low-power mode) and a value for setting the pre-emphasis OFF.

Furthermore, the controller 150 sets high-temperature parameters to the mode setting signal 2 for the receiver that is a data transmission destination of the optical transmitter 101 (the receiver of a counterpart optical transmission apparatus) (operation S210). The high-temperature parameters to be set in the mode setting signal 2 include a transmission speed (lane speed) that is a low speed value (for example, 14 Gbps) used at the time of high temperature (in the low-power mode).

Subsequently, the controller 150 transmits the mode setting signal 1 to the optical transmitter 101 (and the interface circuit 130) and the mode setting signal 2 to the receiver of a counterpart optical transmission apparatus (operation S211). The optical transmission apparatus 100 enters into the low-power mode by this high-temperature parameter setting. Subsequently, the module temperature TM is measured (operation S212), and the module temperature TM thus measured is again compared with a module upper limit temperature TM2 (operation S213). The module upper limit temperature TM2 is set to a value different from TM1 (for example, TM2<TM1) so as to have hysteresis. In this way, it may be possible to avoid frequent switching of the operation mode across the module upper limit temperature TM1 due to a variation of the module temperature TM when only one module upper limit temperature TM1 is used as a threshold value.

When the module temperature TM measured is less than the preset module upper limit temperature TM2 (Yes in the operation S213), the process returns to the operation S204. On the other hand, when the module temperature TM measured exceeds the preset module upper limit temperature TM2 (NO in the operation S213), the process returns to the operation S212.

Upon receiving the mode setting signal 2, the receiver of a counterpart optical transmission apparatus of the optical transmission apparatus 100 (the receiver that is a data transmission destination of the optical transmitter 101) operates in the same operation mode as that of the optical transmitter 101.

Figure 3:
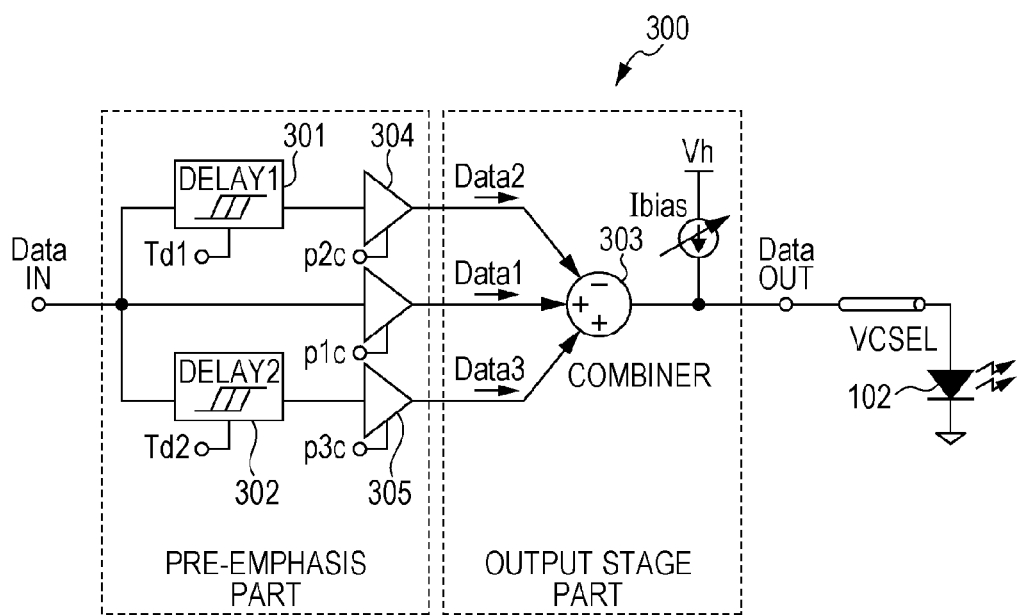
FIG. 3 is a circuit diagram illustrating an example of a bandwidth expander circuit.

FIG. 3 is a circuit diagram illustrating an example of the bandwidth expander circuit, and illustrates a bandwidth expander circuit 300 included in the foregoing light emitting element driver circuit 104. The bandwidth expander circuit 300 emphasizes rising edges of signals and performs the bandwidth expansion (pre-emphasis) by coupling input data (Data 1) with delayed data (Data 2, Data 3), which are delayed by delay circuits 301, 302 having delay amounts different from each other, in a combiner 303. Accordingly, a high speed operation may be enabled for data transmission with a high data rate even when the temperature of the light emitting element 102 becomes high.

In this embodiment 1, when the temperature of the light emitting element 102 is high, the controller 150 stops the bandwidth expansion operation by controlling the delay circuits 301, 302 of the bandwidth expander circuit 300 and buffers 304, 305, which are arranged in the subsequent stage of the delay circuits 301, 302, to stop. In this way, heat generated in the bandwidth expander circuit 300 that becomes a heat source does not be conducted to the light emitting element 102, and a heating effect to the light emitting element 102 is reduced. In this case, the light emitting element 102 transmits data that was not subjected to the bandwidth expansion (pre-emphasis). However, data transmission may be continued without interruption.

Figure 4A:
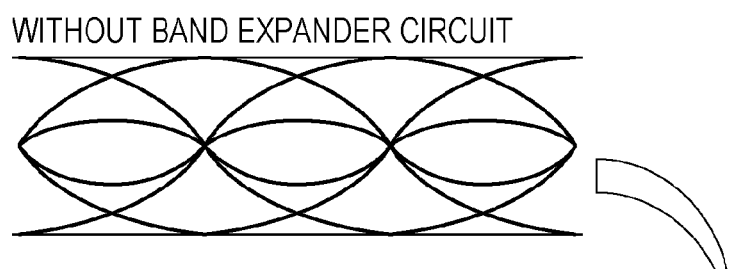
FIGS. 4A and 4B are waveform diagrams of optical outputs to be observed with a presence and absence of bandwidth expansion.
Figure 4B:
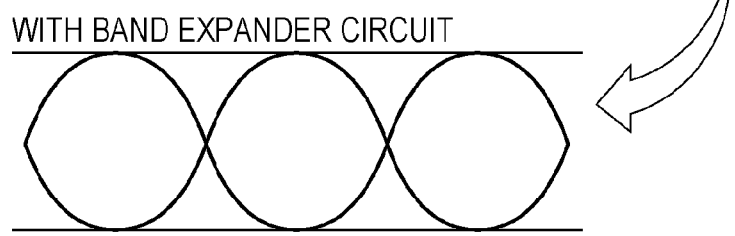

FIGS. 4A and 4B are waveform diagrams of optical outputs to be observed with a presence and absence of the bandwidth expansion. As illustrated FIG. 4A, when the bandwidth expansion by the bandwidth expander circuit 300 is not in operation (at the time of OFF), the waveform of optical output from the light emitting element 102 is in a state where there is an insufficient eye opening. On the other hand, as illustrated in FIG. 4B, when the bandwidth expansion by the bandwidth expander circuit 300 is in operation (at the time of ON), the waveform of optical output from the light emitting element 102 is in a state where there is a sufficient eye opening. In this way, the bandwidth expander circuit 300 may improve the waveform of optical output. However, the operation of the bandwidth expander circuit 300 (the delay circuits 301 and 302, etc.) consumes more electric power, and its self-heating becomes a cause to increase the temperature of light emitting element 102.

Accordingly, the foregoing process enables to reduce power consumption and suppress heat generation from the bandwidth expander circuit 300 itself, namely, suppress an temperature increase of the light emitting element 102 by stopping (turning OFF) the operation of the bandwidth expander circuit 300 when the module temperature TM measured by the temperature sensor 141 exceeds the module upper limit temperature TM1.

Figure 5A:
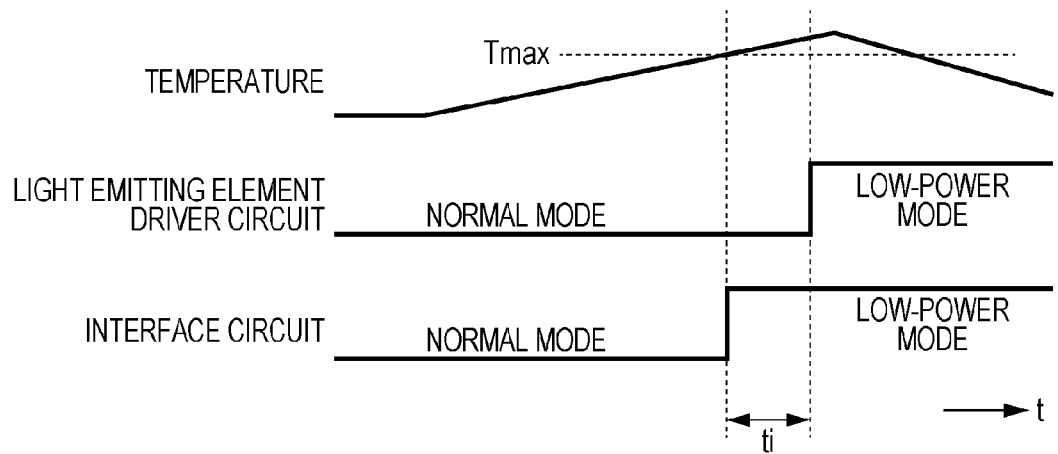
FIG. 5A is a diagram illustrating switch timing of individual sections when a normal mode is switched to a low-power mode.

Now, the transmitted data speed and switch timing of the pre-emphasis operation are described. FIG. 5A is a diagram illustrating the switch timing of individual sections when the normal mode is switched to the low-power mode. In the drawing, the horizontal axis represents the time. As illustrated in the drawing, the module temperature measured by the temperature sensor 141 gradually increases to a higher temperature. The interface circuit 130 operates in the normal mode until the temperature exceeds a maximum operation temperature Tmax. When the module temperature exceeds the maximum operation temperature Tmax, the operation mode is switched to the low-power mode to lower the transmission speed. With regard to the light emitting element driver circuit 104, the operation mode is switched to the low-power mode after the elapse of a preset period ti since the interface circuit 130 is switched to the low-power mode, and the bandwidth expansion (pre-emphasis) is turned OFF.

As described in the above, at the time of switching from the normal mode to the low-power mode, first the interface circuit 130 is switched to the low-power mode to lower the transmission speed, and then the light emitting element driver circuit 104 is switched to the low-power mode to turn OFF the bandwidth expansion (pre-emphasis). When the bandwidth expansion (pre-emphasis) is turned OFF before changing the transmission speed, the light waveform deteriorates. This is to avoid disconnection of data transmission due to the light waveform deterioration.

Figure 5B:
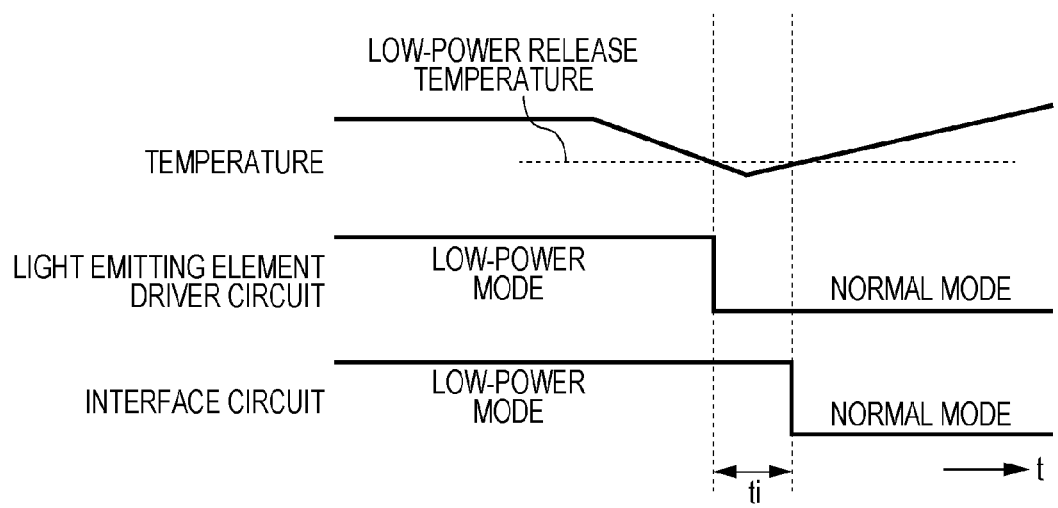
FIG. 5B is a diagram illustrating switch timing of individual sections when the low-power mode is switched to the normal mode.

FIG. 5B is a diagram illustrating the switch timing of individual sections when the low-power mode is switched to the normal mode. As illustrated in the drawing, in the low-power mode, the module temperature measured by the temperature sensor 141 gradually decreases to a lower temperature. The light emitting element driver circuit 104 operates in the low-power mode until the temperature reaches a low-power release temperature. When the module temperature falls below the low-power release temperature, the operation mode is switched to the normal mode and the bandwidth expansion (pre-emphasis) is turned ON. With regard to the interface circuit 130, the operation mode is switched to the normal mode after the elapse of a preset period ti since the light emitting element driver circuit 104 is switched to the normal mode, and the transmission speed is increased.

As described in the above, at the time of switching from the low-power mode to the normal mode, first the light emitting element driver circuit 104 is switched to the normal mode and the bandwidth expansion (pre-emphasis) is turned ON, and then the interface circuit 130 is switched to the normal mode and the transmission speed is increased. This is to avoid data disconnection due to an insufficient operation speed in the light emitting element driver circuit 104 when the bandwidth expansion (pre-emphasis) is turned ON after changing the transmission speed.

Figure 6:
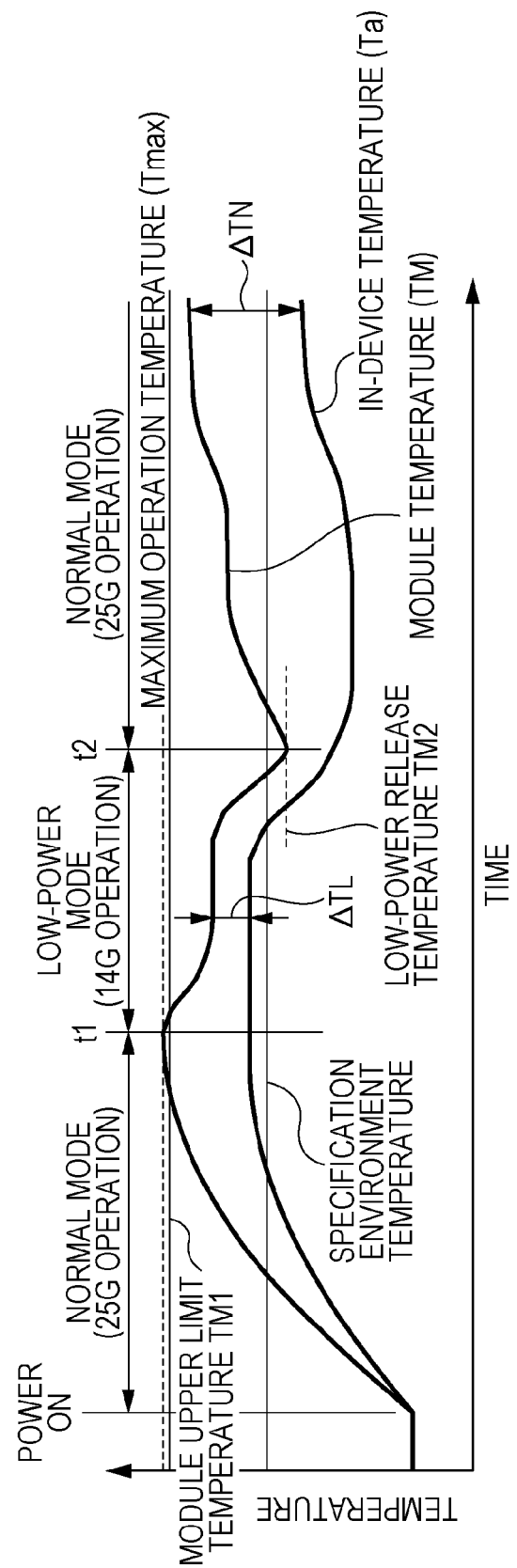
FIG. 6 is a diagram illustrating a temperature variation before and after the mode switching.

FIG. 6 is a diagram illustrating a temperature variation before and after the mode switching. FIG. 6 illustrates the temperature variation when the operation mode is switched from the foregoing low-temperature parameter setting (normal mode) to the high-temperature parameter setting (low-power mode). In the drawing, the horizontal axis represents the time, and the vertical axis represents the temperature.

As illustrated in the drawing, the operation mode is first set to the normal mode in which the transmission speed is a high speed (for example, 25 Gbps) since a power is turned ON. As the normal mode continues, both the module temperature TM and an in-device temperature Ta start to increase. Here, it is assumed that the module temperature TM exceeds the module upper limit temperature TM1 at the time t1 in a normal mode period.

Accordingly, the controller 150 switches the operation mode to the low-power mode in which the transmission speed is changed to a low speed (for example, 14 Gbps). This causes the module temperature TM to decrease. In this case, the switching of the light emitting element driver circuit 104 to the low-power mode may reduce a temperature difference $\Delta TL$ between the in-device temperature Ta and the module temperature TM compared to a temperature difference $\Delta TN$ at the time of the normal mode operation ($\Delta TL \ll \Delta TN$). Accordingly, a maximum operable in-device temperature Ta may be improved from the maximum operation temperature $Tmax-\Delta TN$ to $Tmax-\Delta TL$.

The controller 150 ends the low-power mode when the module temperature TM falls down to the preset low-power release temperature (low-power mode release: TM2) after the continuation of the low-power mode (time t2). The low-power release temperature TM2 may be set to a temperature slightly lower than a specification environment temperature, as illustrated in the drawing. Furthermore, the controller 150 switches the operation mode back to the normal mode, in which the transmission speed is a high speed (for example, 25 Gbps).

Figure 7A:
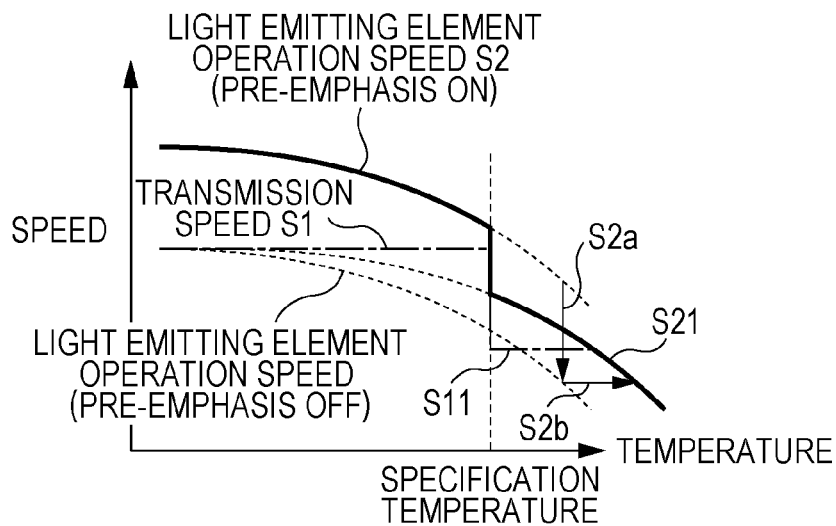
FIG. 7A is a diagram illustrating an improvement effect on a speed by an operation mode switching.

FIG. 7A is a diagram illustrating an improvement effect on the speed by the operation mode switching, and relates to the control example (1). In the drawing, the horizontal axis represents the temperature, and the vertical axis represents the speed. As the temperature increases, an operation speed S2 of the light emitting element 102 rapidly decreases relative to a normal transmission speed S1 that is a desirable speed in the normal operation. The operation speed S2 corresponds to a state where the pre-emphasis is ON. When the temperature becomes equal to or higher than a given specification temperature, the operation speed S2 of the light emitting element 102 no longer satisfies the transmission speed S1.

Thus, in the foregoing process, the operation mode is switched to perform the operation under the high-temperature parameter setting (low-power mode). When the high-temperature parameters are used, the transmission speed S1 is lowered. In this case, an effect corresponding to a lowered portion S2a in the operation speed of the light emitting element 102 itself may be obtained by switching transmission speed from a normal speed S1 to a lower speed S11. Furthermore, an effect corresponding to a suppressed portion S2b in the temperature increase of the light emitting element 102 may be obtained by stopping (turning OFF) the pre-emphasis operation to reduce the power consumption of the bandwidth expander circuit 300 and suppress (lower) the heat generation of the bandwidth expander circuit 300 itself. A transmission speed characteristic S21 obtained by reflecting the lowered portion S2a and the suppressed portion S2b indicates that the light emitting element 102 may perform the optical transmission operation with a speed that satisfies a post-switching transmission speed S11 in a high temperature range equal to or higher than the specification temperature.

Figure 7B:
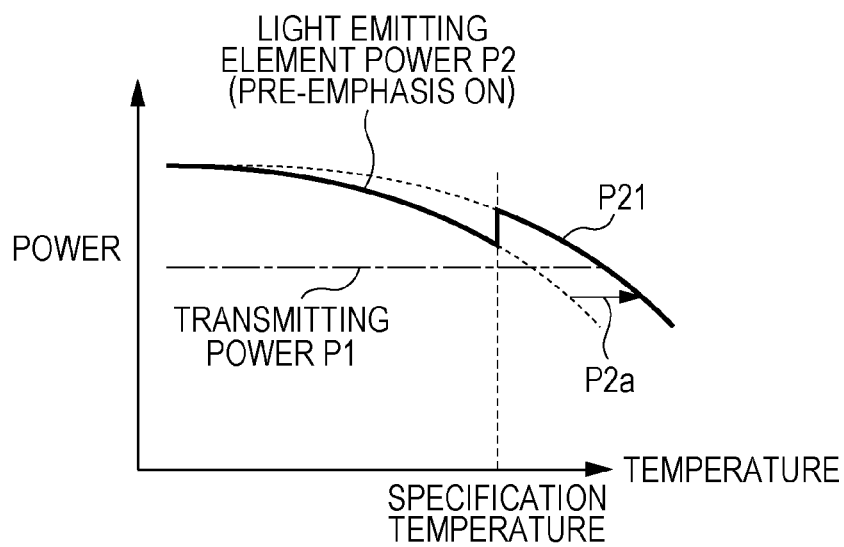
FIG. 7B is a diagram illustrating an improvement effect on an optical output power by the operation mode switching.

FIG. 7B is a diagram illustrating an improvement effect on the optical output power by the operation mode switching, and relates to the control example (1). In the drawing, the horizontal axis represents the temperature, and the vertical axis represents the power (optical output). As the temperature increases, an optical output power P2 of the light emitting element 102 rapidly decreases relative to a normal transmitting power P1 that is a desirable power in the normal operation. The optical output power P2 corresponds to a state where the pre-emphasis is ON. When the temperature becomes equal to or higher than the given specification temperature, the optical output power P2 of the light emitting element 102 no longer satisfies the desirable normal transmitting power P1.

Accordingly, in the foregoing process, the operation mode is switched to perform the operation under the high-temperature parameter setting. Stopping (turning OFF) the pre-emphasis operation in the high-temperature parameter setting enables to reduce the power consumption of the bandwidth expander circuit 300 and suppress (lower) the heat generation of the bandwidth expander circuit 300 itself, making it possible to obtain a suppressed portion P2a in the temperature increase of the light emitting element 102. A power characteristic P21 obtained by reflecting the suppressed portion P2a indicates that the light emitting element 102 may perform the optical transmission operation with a power that satisfies the transmitting power P1, which is a desirable power before and after the switching, in a high temperature range equal to or higher than the specification temperature. Furthermore, the receiver of a counterpart optical transmission apparatus can improve its receiver sensitivity by lowering a transmission rate.

The transmission speed for the low speed case, which is to be set in the foregoing high-temperature parameters 1 and 2, may be any speed as long as the speed satisfies a preset lowest communication speed. Furthermore, the transmission speed does not be limited to a normal value, and may be varied into plural levels in response to the module temperature TM measured. In such a case, the transmission speed may be controlled in such a way that the transmission speed decreases in a step-by-step manner as the module temperature TM increases.

According to the foregoing embodiment 1, the module temperature is detected, and when the temperature is high, the operation mode is switched to the low-power mode and the transmitting data speed is changed to a low speed. Furthermore, the heating effect from the bandwidth expander circuit to the light emitting element arranged nearby may be reduced and the temperature increase of the light emitting element may be suppressed by stopping (turning OFF) the pre-emphasis operation on data to be transmitted, reducing the current consumed by the bandwidth expander circuit when the pre-emphasis operation is being performed, and stopping the heat generation at the bandwidth expander circuit that serves as a heat source. Accordingly, the light emitting element may continue the optical transmission operation at a low electric power even in a high temperature range equal to or higher than the specification temperature.

FIG. 8 is a diagram illustrating a structure of an optical transmission apparatus according to an embodiment 2. In the embodiment 2, in addition to the measurement of the module temperature TM of the module (board 140) by use of the temperature sensor 141 as described in the embodiment 1, another temperature sensor 701 is provided inside the light emitting element driver circuit 104, which is arranged near the light emitting element (for example VCSEL) 102, to measure a light emitting element temperature TV. The other remaining structure is the same as that of the embodiment 1 (FIG. 1), and description thereof is omitted.

Furthermore, in the embodiment 2, a control example of the above (2) performed by the controller 150 at the time of mode switching is described. In the control example of the above (2), the transmitting data speed is changed to a low speed in the low-power mode. Furthermore, the optical power (drive current) of the light emitting element 102 is lowered. At this time, a notification is made to improve sensitivity of a receiver of a counterpart optical transmission apparatus.

Figure 9:
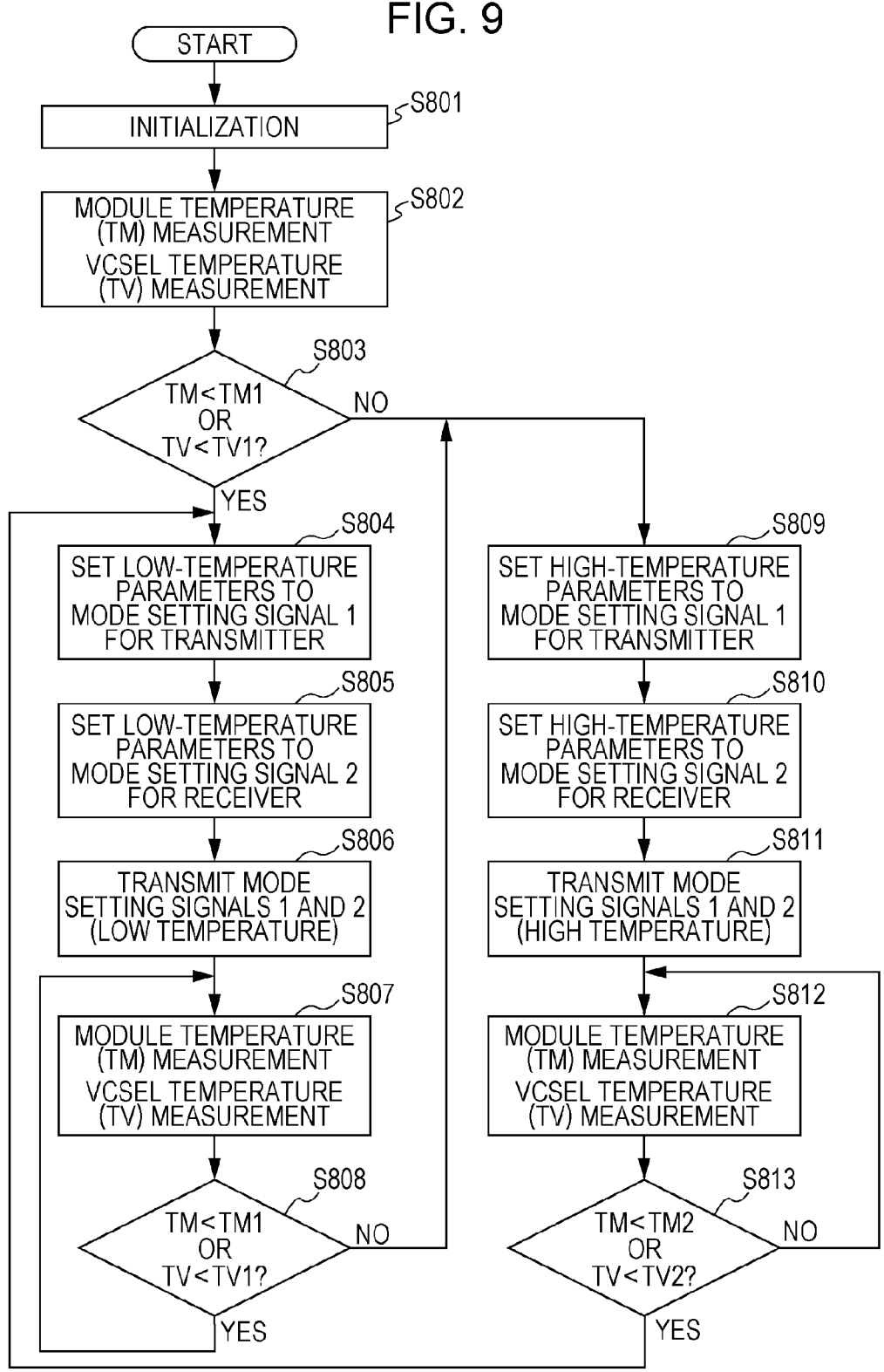
FIG. 9 is a method illustrating control details at a time of mode switching according to the embodiment 2.

FIG. 9 is a method illustrating control details at the time of mode switching according to the embodiment 2, and illustrates the details of control to be performed by the controller 150. After an initialization (operation S801), the controller 150 measures the module temperature TM of the board 140 by use of the temperature sensor 141 and the light emitting element temperature TV of the light emitting element 102 (operation S802). Subsequently, the controller 150 compares the module temperature TM thus measured with a preset module upper limit temperature TM1. Furthermore, the light emitting element temperature TV thus measured is compared with a preset light emitting element upper limit temperature TV1 (operation S803).

When the module temperature TM measured is less than the preset module upper limit temperature TM1 or the light emitting element temperature TV is less than the light emitting element upper limit temperature TV1 (YES in the operation S803), the controller 150 sets low-temperature parameters to the mode setting signal 1 for the optical transmitter 101 (and the interface circuit 130) (operation S804). The low-temperature parameters to be set in the mode setting signal 1 include a transmission speed (lane speed) that is a high speed value used in the normal mode (for example, 25 Gbps) and an optical power (no reduction) of the light emitting element 102.

Furthermore, the controller 150 sets low-temperature parameters to the mode setting signal 2 for the receiver that is a data transmission destination of the optical transmitter 101 (the receiver of a counterpart optical transmission apparatus) (operation S805). The low-temperature parameters to be set in the mode setting signal 2 include a transmission speed (lane speed) that is a high speed value used in the normal mode (for example, 25 Gbps) and a value for a receiving bandwidth in the receiver.

Subsequently, the controller 150 transmits the mode setting signal 1 to the optical transmitter 101 (and the interface circuit 130) and the mode setting signal 2 to the receiver of a counterpart optical transmission apparatus (operation S806). The optical transmission apparatus 100 enters into the normal mode by this low-temperature parameter setting. Subsequently, the module temperature TM and the light emitting element temperature TV are measured (operation S807). The module temperature TM measured is again compared with the module upper limit temperature TM1, and the light emitting element temperature TV is compared with the light emitting element upper limit temperature TV1 (operation S808). When the module temperature TM measured is less than the preset module upper limit temperature TM1 or the light emitting element temperature TV is less than the light emitting element upper limit temperature TV1 (YES in the operation S808), the process returns to the operation S807. When the module temperature TM measured exceeds the preset module upper limit temperature TM1 or the light emitting element temperature TV exceeds the light emitting element upper limit temperature TV1 (NO in the operation S808), the process proceeds to an operation S809.

When the comparison result in the operation S803 or the operation S808 indicates that the module temperature TM measured exceeds the preset module upper limit temperature TM1 or the light emitting element temperature TV exceeds the light emitting element upper limit temperature TV1 (NO in the operation S803 and NO in the operation S808), a high-temperature parameter setting is performed by the operation S809 and beyond.

First, the controller 150 sets high-temperature parameters to the mode setting signal 1 for the optical transmitter 101 (and the interface circuit 130) (operation S809). The high-temperature parameters to be set in the mode setting signal 1 include a transmission speed (lane speed) that is a low speed value (for example, 14 Gbps) used at the time of high temperature (in the low-power mode) and a value for reducing the optical power of the light emitting element 102.

Furthermore, the controller 150 sets high-temperature parameters to the mode setting signal 2 for the receiver that is a data transmission destination of the optical transmitter 101 (the receiver of a counterpart optical transmission apparatus) (operation S810). The high-temperature parameters to be set in the mode setting signal 2 include a transmission speed (lane speed) that is a low speed value (for example, 14 Gbps) used at the time of high temperature (in the low-power mode) and a value for the receiving bandwidth (limited receiving bandwidth) set by a LPF in the receiver.

Subsequently, the controller 150 transmits the mode setting signal 1 to the optical transmitter 101 (and the interface circuit 130) and the mode setting signal 2 to the receiver of a counterpart optical transmission apparatus (operation S811). The optical transmission apparatus 100 enters into the low-power mode by this high-temperature parameter setting. Subsequently, the module temperature TM and the light emitting element temperature TV are measured (operation S812). The module temperature TM measured is compared with a module upper limit temperature TM2, and the light emitting element temperature TV is compared with a light emitting element upper limit temperature TV2 (operation S813).

The module upper limit temperature TM2 is set to a value different from TM1 (for example, TM2<TM1) and the light emitting element upper limit temperature TV2 is set to a value different from the light emitting element upper limit temperature TV1 (for example, TV2<TV1) so as to have hysteresis. In this way, it may be possible to avoid frequent switching of the operation mode across the module upper limit temperature TM1 due to a variation of the module temperature TM when only the module upper limit temperature TM1 is used as a threshold value. Similarly, it may be possible to avoid frequent switching of the operation mode across the light emitting element upper limit temperature TV1 due to a variation of the light emitting element temperature TV when only the light emitting element upper limit temperature TV1 is used as a threshold value.

When the module temperature TM measured is less than the preset module upper limit temperature TM2 or the light emitting element temperature TV is less than the preset light emitting element upper limit temperature TV2 (YES in the operation S813), the process returns to the operation S804. On the other hand, when the module temperature TM measured exceeds the preset module upper limit temperature TM2 or the light emitting element temperature TV exceeds the preset light emitting element upper limit temperature TV2 (NO in the operation S813), the process returns to the operation S812.

Figure 10A:
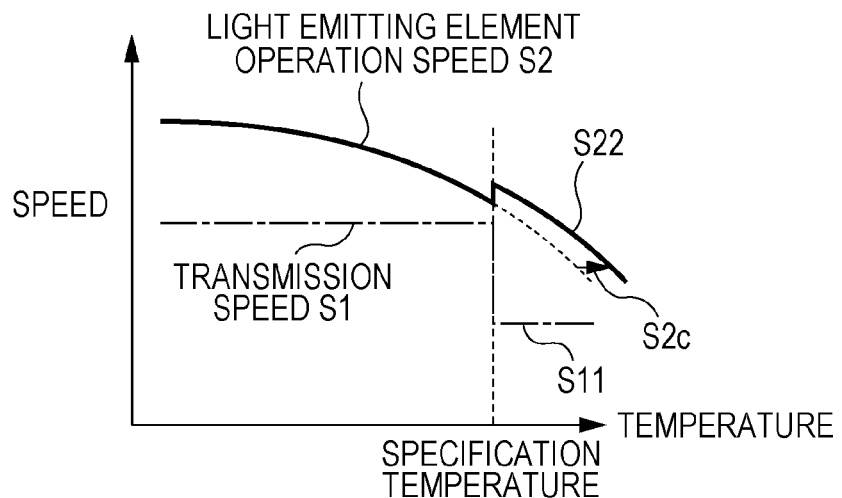
FIG. 10A is a diagram illustrating an improvement effect on a speed by an operation mode switching.

FIG. 10A is a diagram illustrating an improvement effect on the speed by the operation mode switching, and relates to the control example (2). In the drawing, the horizontal axis represents the temperature, and the vertical axis represents the speed. As the temperature increases, an operation speed S2 of the light emitting element 102 rapidly decreases relative to a normal transmission speed S1 that is a desirable speed in the normal operation. The operation speed S2 corresponds to a state where a normal optical power is used (without reduction). When the temperature becomes equal to or higher than a given specification temperature, the operation speed S2 of the light emitting element 102 no longer satisfies the transmission speed S1.

Thus, in the foregoing process, the operation mode is switched to perform the operation under the high-temperature parameter setting (low-power mode). When the high-temperature parameters are used, the transmission speed S1 is lowered. In this case, reducing the optical power of the light emitting element 102 enables to obtain an effect of a lowered temperature portion S2c due to the electric power reduction. A transmission speed characteristic S22 obtained by reflecting such an effect indicates that the light emitting element 102 may perform the optical transmission operation with a speed that satisfies a post-switching transmission speed S11 in a high temperature range equal to or higher than the specification temperature.

Figure 10B:
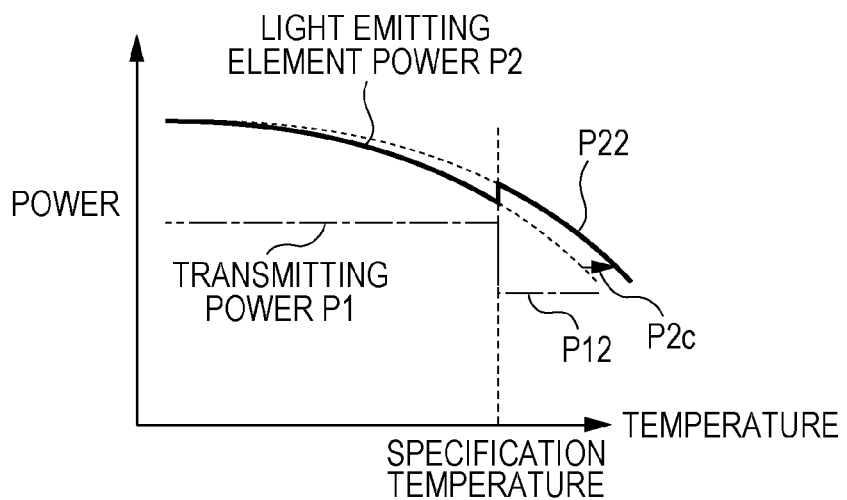
FIG. 10B is a diagram illustrating an improvement effect on an optical output power by the operation mode switching.

FIG. 10B is a diagram illustrating an improvement effect on the optical output power by the operation mode switching, and relates to the control example (2). In the drawing, the horizontal axis represents the temperature, and the vertical axis represents the power (optical output). As the temperature increases, a optical output power P2 of the light emitting element 102 rapidly decreases relative to a normal transmitting power P1 that is a desirable power in the normal operation. The optical output power P2 corresponds to a control state where a normal power is satisfied. When the temperature becomes equal to or higher than the given specification temperature, the optical output power P2 of the light emitting element 102 no longer satisfies the desirable normal transmitting power P1.

Accordingly, in the foregoing process, the operation mode is switched to perform the operation under the high-temperature parameter setting. Reducing the power of the light emitting element 102 in the high-temperature parameter setting enables to obtain an effect of a lowered temperature portion P2c due to the electric power reduction. A power characteristic P22 obtained by reflecting such an effect indicates that the light emitting element 102 may perform the optical transmission operation while satisfying a transmitting power P12 that is a desirable power in a high temperature range equal to or higher than the specification temperature. Furthermore, the receiver of a counterpart optical transmission apparatus can improve its receiver sensitivity by lowering the transmission rate and allowing the controller 150 to limit the receiving bandwidth of the receiver circuit 111.

In the embodiment 2, as is the case with the embodiment 1, at the time of switching from the normal mode to the low-power mode, first the interface circuit 130 is switched to the low-power mode to lower the transmission speed, and then the light emitting element driver circuit 104 is switched to the low-power mode to reduce the power of the light emitting element 102. Furthermore, at the time of switching from the low-power mode to the normal mode, first the light emitting element driver circuit 104 is switched to the normal mode to increase the optical power of the light emitting element 102, and then the interface circuit 130 is switched to the normal mode to increase the transmission speed.

The light emitting element 102 described in the embodiment 2 has an individual variability characteristic due to thermal contact variation or cooling performance variation of radiation members, which occur when they are assembled. Accordingly, the direct detection of the temperature variation of the light emitting element 102 by use of the temperature sensor enables to perform the switching to the low-power mode at an appropriate temperature.

According to the foregoing embodiment 2, the module temperature and the temperature of the light emitting element are each detected, and when the temperature is high, the operation mode is switched to the low-power mode and the transmitting data speed is changed to a low speed. Furthermore, the power of transmitting data is reduced to reduce the current consumed by the light emitting element so as to suppress the temperature increase of the light emitting element. Accordingly, the light emitting element may continue the optical transmission operation at a low electric power even in a high temperature range equal to or higher than the specification temperature.

Figure 11:
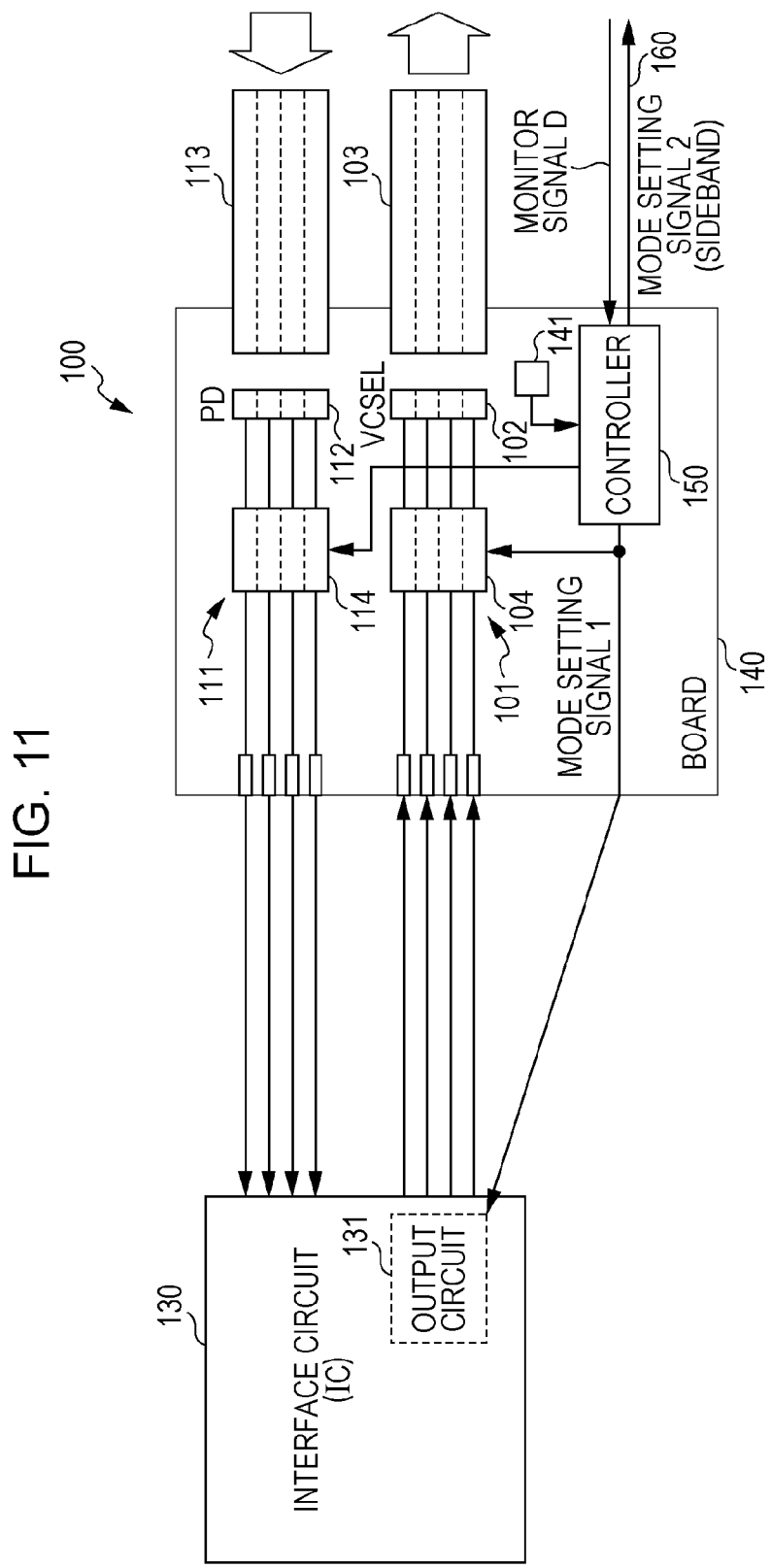
FIG. 11 is a diagram illustrating a structure of an optical transmission apparatus according to an embodiment 3.

FIG. 11 is a diagram illustrating a structure of an optical transmission apparatus according to an embodiment 3. The embodiment 3 is configured such that the controller 150 receives a monitor signal D (feedback input), which corresponds to a state of light signal in the receiver of a counterpart optical transmission apparatus (the receiver that is a data transmission destination of an optical transmitter 101), and the monitor signal D is used for switching of the operation mode. The other remaining structure is the same as that of the embodiment 1 (FIG. 1), and description thereof is omitted.

In the embodiment 3, a control example of the above (3) performed by the controller 150 at the time of mode switching is described. In the control example of (3), a reducing operation for reducing the number of the multiple transmission channels (the number of lanes) is performed in the low-power mode.

Figure 12:
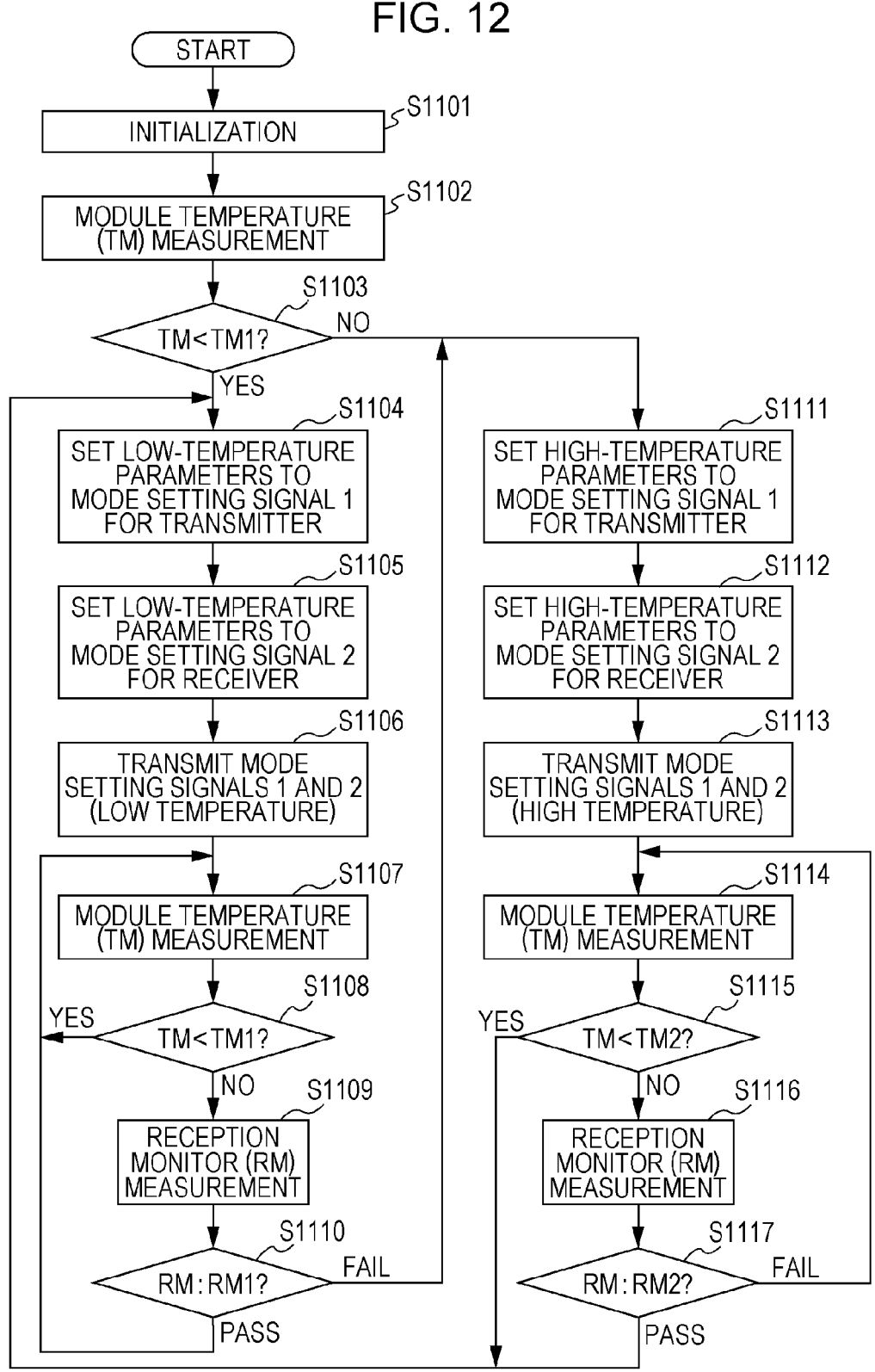
FIG. 12 is a method illustrating control details at a time of mode switching according to the embodiment 3.

FIG. 12 is a method illustrating control details at the time of mode switching according to the embodiment 3, and illustrates the details of control to be performed by the controller 150. After an initialization (operation S1101), the controller 150 measures the module temperature TM of the board 140 by use of the temperature sensor 141 (operation S1102). Subsequently, the controller 150 compares the module temperature TM thus measured with a preset module upper limit temperature TM1 (operation S1103).

When a comparison result of the operation S1103 indicates that the module temperature TM measured is less than the preset module upper limit temperature TM1 (YES in the operation S1103), the controller 150 sets low-temperature parameters to the mode setting signal 1 for the optical transmitter 101 (and the interface circuit 130) (operation S1104). The low-temperature parameters to be set in the mode setting signal 1 include a value for the number of transmission channels (for example, four channels), which are used in the normal mode.

Furthermore, the controller 150 sets low-temperature parameters to the mode setting signal 2 for the receiver that is a data transmission destination of the optical transmitter 101 (the receiver of a counterpart optical transmission apparatus) (operation S1105). The low-temperature parameters to be set in the mode setting signal 2 include a value for the number of transmission channels (for example, four channels), which are used in the normal mode.

Subsequently, the controller 150 transmits the mode setting signal 1 to the optical transmitter 101 (and the interface circuit 130) and the mode setting signal 2 to the receiver of a counterpart optical transmission apparatus (operation S1106). The optical transmission apparatus 100 enters into the normal mode by this low-temperature parameter setting. Subsequently, the module temperature TM is measured (operation S1107), and the module temperature TM thus measured is again compared with the module upper limit temperature TM1 (operation S1108). When the module temperature TM measured is less than the preset module upper limit temperature TM1 (YES in the operation S1108), the process returns to the operation S1107.

On the other hand, when the module temperature TM measured exceeds the preset module upper limit temperature TM1 (NO in the operation S1108), the monitor signal D is received from the counterpart optical transmission apparatus (operation S1109). A monitor value RM of the monitor signal D is information describing a state of eye opening or a power of light signal measured by the receiver of the counterpart optical transmission apparatus. The state of eye opening may be measured by use of an error correction (FEC) or the like, which is provided in the receiver of the counterpart optical transmission apparatus.

Subsequently, the monitor value RM thus received is compared with a set monitor value RM1 set in advance (operation S1110). For example, in a case where the monitor value RM describes the power of light signal, it is determined as "PASS" when the monitor value RM exceeds a set monitor value RM1 that is set in advance for the power of light signal, and it is determined as "FAIL" when the monitor value RM is less than the set monitor value RM1 that is set in advance for the power of light signal. In a case where the monitor value RM describes FEC of light signal, it is determined as "FAIL" when the monitor value RM exceeds a set monitor value RM1 that is set in advance for an error rate of light signal, and it is determined as "PASS" when the monitor value RM is less than the set monitor value RM1 that is set in advance for the error rate of light signal. When a comparison result indicates that the monitor value RM received is "PASS" (PASS in the operation S1110), the process returns to the operation S1107, and when the monitor value RM received is "FAIL" (FAIL in the operation S1110), the process proceeds to an operation S1111.

When the comparison result in the operation S1103 indicates that the module temperature TM measured exceeds the preset module upper limit temperature TM1 (NO in the operation S1103) and when the monitor value RM received is "FAIL" (FAIL in the operation S1110), a high-temperature parameter setting is performed by the operation S1111 and beyond.

First, the controller 150 sets high-temperature parameters to the mode setting signal 1 for the optical transmitter 101 (and the interface circuit 130) (operation S1111). The high-temperature parameters to be set in the mode setting signal 1 include a value for the number of transmission channels (for example, two channels), which is reduced at the time of high temperature (in the low-power mode).

Furthermore, the controller 150 sets high-temperature parameters to the mode setting signal 2 for the receiver that is a data transmission destination of the optical transmitter 101 (the receiver of the counterpart optical transmission apparatus) (operation S1112). The high-temperature parameters to be set in the mode setting signal 2 include a value for the number of transmission channels (for example, two channels), which is reduced at the time of high temperature (in the low-power mode).

Subsequently, the controller 150 transmits the mode setting signal 1 to the optical transmitter 101 (and the interface circuit 130) and the mode setting signal 2 to the receiver of the counterpart optical transmission apparatus (operation S1113). The optical transmission apparatus 100 enters into the low-power mode by this high-temperature parameter setting. Subsequently, the module temperature TM is measured (operation S1114), and the module temperature TM thus measured is compared with a module upper limit temperature TM2 (operation S1115). The module upper limit temperature TM2 is set to a value different from the module upper limit temperature TM1 (for example, TM2<TM1) so as to have hysteresis. In this way, it may be possible to avoid frequent switching of the operation mode across the module upper limit temperature TM1 due to a variation of the module temperature TM when only the module upper limit temperature TM1 is used as a threshold value.

When the module temperature TM measured is less than the preset module upper limit temperature TM2 (YES in the operation S1115), the process returns to the operation S1104. On the other hand, when the module temperature TM measured exceeds the preset module upper limit temperature TM2 (NO in the operation S1115), the monitor signal D is received from the counterpart optical transmission apparatus (operation S1116).

Subsequently, the monitor value RM thus received is compared with a set monitor value RM2 set in advance (operation S1117). The set monitor value RM2 is set to a value different from RM1 (for example, RM2<RM1) so as to have hysteresis. In a case where the monitor value RM describes the power of light signal, it is determined as "PASS" when the monitor value RM exceeds a set monitor value RM2 that is set in advance for the power of light signal, and it is determined as "FAIL" when the monitor value RM is less than the set monitor value RM2 that is set in advance for the power of light signal. In a case where the monitor value RM describes FEC of light signal, it is determined as "FAIL" when the monitor value RM exceeds a set monitor value RM2 that is set in advance for the error rate of light signal, and it is determined as "PASS" when the monitor value RM is less than the set monitor value RM2 that is set in advance for the error rate of light signal. When a comparison result indicates that the monitor value RM received is "PASS" (PASS in the operation S1117), the process returns to the operation S1104, and when the monitor value RM received is "FAIL" (FAIL in the operation S1117), the process returns to the operation S1114.

Figure 13A:
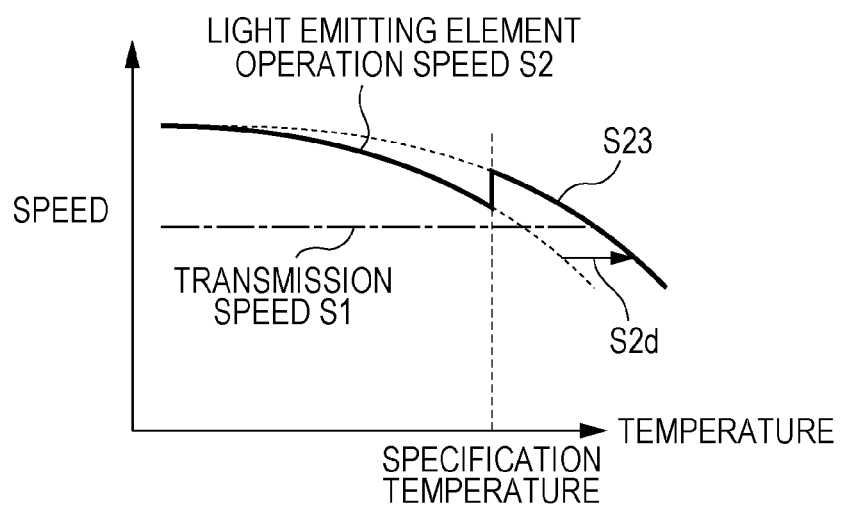
FIG. 13A is a diagram illustrating an improvement effect on a speed by an operation mode switching.

FIG. 13A is a diagram illustrating an improvement effect on the speed by the operation mode switching, and relates to the control example (3). In the drawing, the horizontal axis represents the temperature, and the vertical axis represents the speed. As the temperature increases, an operation speed S2 of the light emitting element 102 rapidly decreases relative to a normal transmission speed S1 that is a desirable speed in the normal operation. The operation speed S2 corresponds to a state where a normal number of transmission channels (without reduction, four channels, for example) is used. When the temperature becomes equal to or higher than a given specification temperature, the operation speed S2 of the light emitting element 102 no longer satisfies the normal transmission speed S1.

Thus, in the foregoing process, the operation mode is switched to perform the operation under the high-temperature parameter setting (low-power mode). When the high-temperature parameters are used, the number of transmission channels is reduced (for example, two channels). Reducing the number of transmission channels as described above reduces parallel lanes to be driven in the light emitting element 102, which are arranged in an array form, and enables to obtain an effect of a lowered temperature portion Std due to the electric power reduction of the light emitting element 102. A transmission speed characteristic S23 obtained by reflecting such an effect indicates that the light emitting element 102 may perform the optical transmission operation with a speed that satisfies the normal transmission speed S1 before and after the switching in a high temperature range equal to or higher than the specification temperature.

Figure 13B:
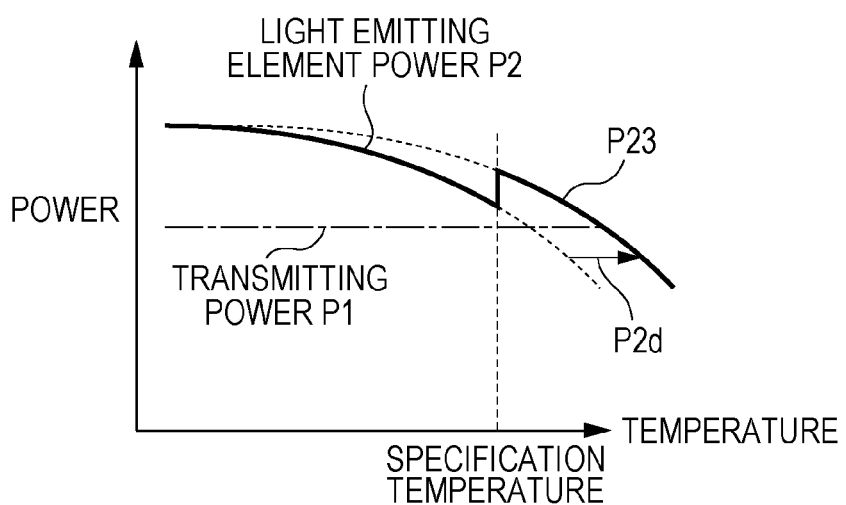
FIG. 13B is a diagram illustrating an improvement effect on an optical output power by the operation mode switching.

FIG. 13B is a diagram illustrating an improvement effect on the optical output power by the operation mode switching, and relates to the control example (3). In the drawing, the horizontal axis represents the temperature, and the vertical axis represents the power (optical output). As the temperature increases, a optical output power P2 of the light emitting element 102 rapidly decreases relative to a normal transmitting power P1 that is a desirable power in the normal operation. When the temperature becomes equal to or higher than the given specification temperature, the optical output power P2 of the light emitting element 102 no longer satisfies the desirable normal transmitting power P1.

Accordingly, in the foregoing process, the operation mode is switched to perform the operation under the high-temperature parameter setting. Reducing the number of transmission channels in the high-temperature parameter setting enables to obtain an effect of a lowered temperature portion Ptd due to the electric power reduction. A power characteristic P23 obtained by reflecting such an effect indicates that the light emitting element 102 may perform the optical transmission operation while satisfying the desirable normal transmitting power P1 in a high temperature range equal to or higher than the specification temperature.

According to the foregoing embodiment 3, the module temperature is detected and the monitor signal, which is a feedback from the receiver of the counterpart optical transmission apparatus, is received, and when the temperature is high, the operation mode is switched to the low-power mode and the number of transmission channels is reduced. For example, in the light emitting element 102 that has a parallel array formation, channels that are being driven and channels that are not being driven may be alternatively arranged to avoid localized temperature increases, thereby achieving the temperature reduction. In this way, when the temperature is high, the current consumed by the light emitting element is reduced by an amount corresponding to the reduced number of channels that were being driven in the light emitting element and the temperature increase of the light emitting element is suppressed. In this way, the light emitting element may continue the optical transmission operation at a low electric power even in a high temperature range equal to or higher than the specification temperature.

Furthermore, the foregoing embodiments 1-3 are configured such that the mode setting signal 2 is transmitted to the receiver of a counterpart optical transmission apparatus (the receiver that is a data transmission destination of the optical transmitter 101) by using the side-band transmission system 160. However, the configuration is not limited thereto. For example, the mode setting signal 2 may be transmitted using an in-band transmission. That is, the mode setting signal 2 may be transmitted as part of a control signal, which is combined with transmitting data for transmission, through the array fiber 103 connected to the optical transmitter 101. Furthermore, the monitor signal D described in the embodiment 3 may be combined with transmitting data as part of a control signal, and the transmitting data thus combined may be received from a transmitter of the counterpart optical transmission apparatus (a transmitter that is a transmission source of data which the optical receiver 111 receives) through the array fiber 113. These mode setting signal 2 and the monitor signal D may be obtained by extracting the control signal from received data at the receiver.

All or any part of various process functions performed by the controller 150, the receiver circuit 111, the light emitting element driver circuit 101, and the output circuit 131 may be executed by a microcomputer such as a central processing unit (CPU), a micro processing unit (MPU), a micro controller unit (MCU), etc. All or any part of the various process functions may be executed in programs that are analyzed and executed by a CPU (or other microcomputer such as MPU, MCU, etc.) or hardware of wired logics such as circuits. Furthermore, all or any part of the various process functions may be executed by use of a programmable logic circuit. The programmable logic circuit may include, for example, a field-programmable gate array (FPGA).

With regard to the embodiments 1-3 described above, the control of the control example (1) is performed using the configuration of FIG. 1 in the embodiment 1, the control of the control example (2) is performed using the configuration of FIG. 8 in the embodiment 2, and the control of the control example (3) is performed using the configuration of FIG. 11 in the embodiment 3. That is, the examples are described for the cases where a single control example is used in each embodiment. However, the example is not limited thereto. For example, one of the controls of the control examples (1)-(3) or combination thereof may be performed in any one of the configuration of FIG. 1 of the embodiment 1, the configuration of FIG. 8 of the embodiment 2, and the configuration of FIG. 11 of the embodiment 3. The more number of the control examples (1)-(3) are combined, the more pieces of information may be collected, thereby making it possible to perform the operation mode switching more accurately.

Each of the embodiments described above provides not a countermeasure to a case where the temperature is high due to heat generation by the light emitting element itself, but a control function to control the operation of the light emitting element driver circuit (bandwidth expander circuit) that is a nearby circuit producing the heating effect to the light emitting element. Such configurations enable to suppress the temperature and reduce the power consumption of the whole module, and maintain a stable operation by allowing the transmission (transmitting and receiving) of light signals of the whole module to continue even in a range exceeding the given specification temperature.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
an optical transmitter that includes a light emitting element and a driver circuit for the light emitting element;
a temperature sensor that detects a temperature of the optical transmitter; and
a controller that switches an operation mode of the optical transmitter from a normal mode to a low-power mode so as to reduce a heating effect to the light emitting element and allow an operation of the light emitting element to continue when the temperature detected by the temperature sensor is equal to or higher than a given temperature.

2. The optical transmission apparatus according to claim 1, further comprising:
a transmitting interface circuit that sends data to the optical transmitter,
wherein, in the low-power mode, the controller controls the transmitting interface circuit and the driver circuit so as to lower respective transmission speeds thereof.

3. The optical transmission apparatus according to claim 1, wherein the driver circuit includes a bandwidth expander circuit, and
in the low-power mode, the controller controls the bandwidth expander circuit of the driver circuit so as to stop an operation thereof.

4. The optical transmission apparatus according to claim 1, wherein, in the low-power mode, the controller controls the light emitting element so as to lower an output optical power thereof.

5. The optical transmission apparatus according to claim 1, wherein, in the low-power mode, the controller improves receiver sensitivity of another optical receiver that is a counterpart of the optical transmitter by controlling another optical receiver so as to limit a receiving bandwidth thereof.

6. The optical transmission apparatus according to claim 1, further comprising:
a transmitting interface circuit that sends data to the optical transmitter,
wherein, in the low-power mode, the controller reduces the heating effect to the light emitting element by controlling the transmitting interface circuit and the driver circuit so as to reduce respective numbers of transmission channels thereof.

7. The optical transmission apparatus according to claim 3, wherein, in the low-power mode, the controller controls the light emitting element driver circuit so as to stop a bandwidth expansion operation thereof after controlling the transmitting interface circuit and the driver circuit so as to lower respective transmission speeds thereof.

8. The optical transmission apparatus according to claim 3, wherein, when returning from the low-power mode to the normal mode, the controller controls the transmitting interface circuit and the driver circuit so as to increase transmission speeds thereof after controlling the driver circuit so as to turn on a bandwidth expansion operation.

9. The optical transmission apparatus according to claim 1, wherein the controller transmits information regarding the operation mode of the optical transmitter to a receiver provided in an optical transmission apparatus that is a counterpart of the optical transmitter using a transmission system in a side-band, and the receiver and an interface circuit of the optical transmission apparatus that is a counterpart of the optical transmitter switch operation modes thereof based on the information regarding the operation mode in the sideband.

10. The optical transmission apparatus according to claim 1,
wherein the controller transmits information regarding the operation mode of the optical transmitter to a receiver provided in an optical transmission apparatus that is a counterpart of the optical transmitter by including the information in transmitting data for an in-band transmission, and
the receiver and an interface circuit of the optical transmission apparatus that is a counterpart of the optical transmitter switch operation modes thereof based on the information regarding the operation mode in the in-band transmission.

11. The optical transmission apparatus according to claim 1,
wherein the temperature sensor is provided near the light emitting element.

12. The optical transmission apparatus according to claim 1,
wherein the temperature sensor is provided inside the light emitting element driver circuit.

13. The optical transmission apparatus according to claim 1,
wherein the controller receives a feedback of a monitor signal measured by a receiver provided in an optical transmission apparatus that is a counterpart of the optical transmitter, and performs a control to switch the operation mode of the optical transmitter using the monitor signal.

14. The optical transmission apparatus according to claim 13,
wherein the monitor signal received by the controller indicates an optical power measured by the receiver provided in an optical transmission apparatus that is a counterpart of the optical transmitter.

15. The optical transmission apparatus according to claim 13,
wherein the monitor signal received by the controller indicates an eye opening measured by the receiver provided in an optical transmission apparatus that is a counterpart of the optical transmitter.

16. An optical transmission method of an optical transmission apparatus including an optical transmitter that includes a light emitting element and a driver circuit for the light emitting element, a temperature sensor, and a controller, the optical transmission method comprising:
detecting a temperature of the optical transmitter by temperature sensor; and
switching an operation mode of the optical transmitter from a normal mode to a low-power mode so as to reduce a heating effect to the light emitting element and allow an operation of the light emitting element to continue when a temperature detected by the temperature sensor is equal to or higher than a given temperature of the light emitting element.

17. The optical transmission method according to claim 16,
wherein, in the low-power mode, the controller controls a transmitting interface circuit and the light emitting element driver circuit so as to lower respective transmission speeds thereof.

18. An optical transmission apparatus, comprising:
an optical transmitter that includes a light emitting element and a driver circuit for the light emitting element;
a temperature sensor that detects a temperature of the optical transmitter; and
a controller that switches, by transmitting a mode setting signal, an operation mode for transmission by the optical transmitter from a normal transmission mode to a lower transmission mode, when the temperature detected by the temperature sensor is equal to or higher than a given temperature so as to reduce a heating effect to the light emitting element and allow an operation of the light emitting element.

19. The optical transmission apparatus according to claim 18,
wherein, in the lower transmission mode, the controller further controls the light emitting element so as to lower an output optical power of the light emitting element.

* * * * *

UNITED STATES PATENT AND TRADEMARK OFFICE
CERTIFICATE OF CORRECTION

| | | |
|---|---|---|
| PATENT NO. | : 9,083,467 B2 | Page 1 of 1 |
| APPLICATION NO. | : 13/669957 | |
| DATED | : July 14, 2015 | |
| INVENTOR(S) | : Satoshi Ide et al. | |

It is certified that error appears in the above-identified patent and that said Letters Patent is hereby corrected as shown below:

ON THE TITLE PAGE

ITEM (30) Foreign Application Priority Data

Insert --(30) Foreign Application Priority Data

JP 2012-004502   Jan. 12, 2012--.

Signed and Sealed this
Thirteenth Day of October, 2015

Michelle K. Lee
*Director of the United States Patent and Trademark Office*